United States Patent Office 3,269,912
Patented August 30, 1966

3,269,912
ALUMINUM OXIDE DEPOT VACCINES
Alfred Grafe, Weinheim, Germany, assignor to C. F. Boehringer & Soehne Gesellschaft mit beschrankter Haftung, Mannheim-Waldhof, Germany
No Drawing. Filed Apr. 8, 1963, Ser. No. 271,448
13 Claims. (Cl. 167—78)

This invention relates to new and useful improvements in aluminum oxide depot vaccines.

Certain aluminum oxides designated as γ-aluminum oxides have been used for the production of depot vaccines. Such depot vaccines have the advantage of a considerably improved and stabilized effectiveness compared with vaccines which are not combined with aluminum oxide or which are used in association with aluminum hydroxide. These depot vaccines are prepared by prolonged shaking or other thorough agitation such as for 20 minutes of the finely divided aluminum oxide with the desired vaccine solution. Though it is doubtful whether true adsorption phenomena are present, these aluminum oxide depot vaccines have been referred to as aluminum oxide and specifically γ-aluminum oxide adsorbate vaccines. These vaccines may contain as antigens a member of the group consisting of the viruses, bacteria, the endotoxins, the ectotoxins and the corresponding toxoids together with a finely dispersed aluminum oxide not injurious to the human and animal tissues, and suitable γ-aluminum oxides have been stated to possess a molar surface of about 40,000 to 80,000 m.$^2$, there being additionally present substances for buffering the vaccine to the desired pH value and rendering it substantially isotonic, and water as the liquid medium of the vaccine. Measurements in accordance with the BET method conventional for the determination of molar surfaces have shown that surface sizes between $10^4$ and $2 \times 10^4$ m.$^2$ per mol are applicable. The components of the vaccine are normally so adjusted that 1 ml. of the mixture contains about $10^6$–$10^9$ viruses or bacteria or the equivalent quantity of the toxin or toxoid (i.e. about 50 to 500 flocculation units) and a quantity of the aluminum oxide possessing for instance a surface of about 2–20 m.$^2$. The thorough agitation of the components is carried out for about 20 to 40 minutes at a temperature of about 0 to 30° C. and preferably below 10° C. The surface designation for the γ-aluminum oxide in these vaccines defines the aggregate of the surfaces of the particles of aluminum oxide such as that prepared in accordance with Fricke et al., Berichte der Deutschen Chem. Gesellschaft 1937, page 2318. Expressed in parts by weight the particular aluminum oxide is present in the above described vaccines to a quantity of about 2.5 to 50 mg. per 1 ml. of the vaccine. Depot vaccines of the above described type are for instance disclosed in Austrian Patent No. 216,142 of July 10, 1961.

It has been found that aluminum oxides and especially those designated as γ-aluminum oxides in the said Austrian patent and in accordance with the disclosure of Fricke et al. do not yield vaccine products of uniform potency. This is the result of variations in the capacity in antigen take-up of given aluminum oxides even though they are similar in if not of substantially the same order of aggregate molar surface of particles. It was furthermore found that aluminum oxides and especially the γ-oxide hitherto used for depot vaccines may have a differential take-up capacity for non-lipoid viruses and for lipoid viruses. Thus for instance a given aluminum oxide may have a relatively high take-up capacity for a non-lipoid virus such as of the polio type and yet have a relatively low lipoid virus take-up capacity. Such a preparation can therefore not be satisfactorily used as the base material from which satisfactory aluminum oxide depot vaccines may be prepared with both the non-lipoid and the lipoid virus type. The lipoid viruses are notable those of the type of measles virus, influenza-, mumps- and Newcastle disease-virus.

Still further the aluminum oxides such as γ-aluminum oxides hitherto used for a depot vaccine preparation require relatively long agitation times of at least 20 minutes in order to obtain products of maximum potency of which the particular aluminum oxide is capable by reason of its take-up capacity. This take-up capacity is also in many cases per se insufficient to obtain a satisfactory virus vaccine, i.e. one of desired high potency. It is in many cases still further desirable if not necessary to permit a 24 hour period after shaking to elapse as thereby the take-up of virus by the particular aluminum oxide preparation may be improved. All these difficulties present already time-wise considerable production problems.

In the practical application of the hitherto proposed aluminum oxide such as γ-oxide depot vaccines the oxide preparations as for instance those prepared according to Fricke constitute a more or less granular powder. This powder is essentially constituted as is determinable by the electron microscope of aggregates of crystals in needle form which are netted together and which aggregates are present as particles with a diameter between about 0.2 and 0.4µ with most of the remainder of the particles being larger some going up to 6µ. This is too large for small cannulae such as they are used for the injection of children. This then requires extensive grinding and pulverizing of the aluminum oxide to reduce the particle size. Even then, however, the unground as well as the ground aluminum oxide such as the γ-aluminum oxides show undesirable sedimentation properties. No matter what substrate or additives are used these aluminum oxides will in most part settle within 1 minute. This is a considerable disadvantage for vaccine production as it necessitates ampules the contents of which are limited to a single dosage injection. If several dosages are filled into 1 ampule the rapid sedimentation of the γ-aluminum oxide charged with virus no longer permits a uniform distribution of antigen. On the other hand for large-scale vaccinations relatively large charges of vaccine material are necessary. Attempts to prevent or improve the relatively rapid sedimentation of aluminum oxide material from the depot vaccine by pharmaceutically known stabilizers such as gelatin, polyvinyl-pyrrolidone, carboxymethyl - cellulose, hydroxyethylmethyl - cellulose and methylcellulose have not been successful.

One object of the invention is an aluminum oxide depot vaccine of substantially uniform and high potency and having as the aluminum oxide material therein one characterized by a substantially uniform and high predictable take-up capacity for both lipoid and non-lipoid type viruses;

Another object of the invention comprises aluminum oxide suspensions for a vaccine preparation and characterized by substantial stability of the suspension, i.e. substantial absence of sedimentation of the aluminum oxide therein;

Another object of the invention comprises aluminum oxide depot vaccines prepared from such suspensions and in the preparation of which prolonged shaking and prolonged subsequent standing is not required;

Still another object of the invention comprises such aluminum oxide depot vaccines in which the aluminum oxide particle size is sufficiently small to pass small cannulae;

A still further object of this invention comprises multi-dosage amounts of such aluminum oxide depot vaccines, or such vaccines permitting the preparation of such multi-dosage amounts;

The foregoinng and still further objects of the invention will be apparent from the following description.

The invention resides in the discovery that aluminum oxide suspensions and depot vaccines produced therefrom fulfill the stated objectives when using as the aluminum oxide a member selected from the group consisting of aluminum oxide aerosol and δ-aluminum oxide. Aluminum oxide aerosols useful in accordance with the invention are finely divided aluminum oxides obtained by thermal hydrolysis in the gas phase of a hydrolyzable and high temperature vaporizable aluminum compound such as aluminum chloride in the presence of a hydrolyzing atmosphere. Such aerosols and their production are conventionally known for silica and substantially the same methods of their production are applicable to the preparation of aluminum oxide. Such aerosols and their preparation are for instance described in the German Patents Nos. 830,786, 873,083, 878,342, 891,541. The aluminum oxide aerosols usable in accordance with the invention constitute powdery bluish white crystalline materials.

In contrast to the crystal agglomerates of the type of aluminum oxides above described and proposed by Fricke and said Austrian patent, the aluminum oxide aerosols and δ-aluminum oxides in accordance with the instant invention constitute, as seen under the electron microscope, indivdual crystals of substantially spherical if not actually round or ball-type configuration which do not tend to form crystal agglomerates. When reference is herein made to crystal agglomeration or relative freedom thereof or relative freedom from a tendency to crystal agglomeration in connection with the aluminum oxides of the prior art and those of the instant invention, there is meant thereby that agglomeration or relative lack thereof which is observable or takes place upon wetting or contact of the aluminum oxide with substantially ion-free water.

The aluminum oxide aerosol or δ-aluminum oxide usable in accordance with the invention possess particle sizes of substantially 25 to 1,000 A. and preferably 50 to 300 A. It is important in this connection that a sufficient proportion of the oxides in accordance with the invention possess the indicated particle size in order to assure a colloidal dispersion so that it is possible and within the scope of my invention that some of the particles may be larger than indicated as long as the proportion of the particles of the indicated size will carry the larger particles and maintain the same in colloidal dispersion and further provide that no particle is larger than $0.1\mu$. Measurements in accordance with the BET method conventional for the determinations of molar surfaces have shown that the molar surface of these particles is about 9,000 to 12,000 m.$^2$.

A particularly useful aluminum oxide aerosol is for instance one having a specific gravity of about 3.4, a particle size predominantly of the order of about 120 A. with a molar surface of the order of about 10,000 m.$^2$. The product is highly dispersible, readily yielding colloidal solutions. This particular product is obtained by flame hydrolysis of aluminum chloride in a water vapor atmosphere at temperatures between about 1100 and 1200° C. Investigation indicates that at least in part the aluminum oxide is substantially of the type established for the δ-aluminum oxide.

The δ-aluminum oxide useful in accordance with the invention is an aluminum oxide product as it is for instance described and identified in the following literature: Stumpf et al., Ind. Eng. Chem., 42, 1950, p. 1398–1403; Glemser et al., Angew. Chem., 67, 1955, p. 652; Day, Nature, 170, 1952, p. 539; Structure Reports, 13, 1952, pp. 223–226. Its identification is also definable in accordance with the ASTM X-Ray Powder Data File 1961, card "delta alumina."

The δ-aluminum oxide useful in accordance with the invention should generally conform to the same ranges of particle size set forth above for the aluminum oxide aerosol. Also the δ-aluminum oxides constitute water highly dispersable products substantially forming colloidal solutions and generally conform in specific gravity and molar surface to the aerosols. A particularly useful product is also in this case one having a specific gravity of about 3.5 and a primary particle size of the order of about 100 to 120 A. The molar surface of the particles of such a product is about 10,500 m.$^2$.

In the following the invention is described in still further detail in connection with the aluminum oxide aerosols. Whatever is set forth there, however, with respect to these aerosols equally applies to δ-aluminum oxide and wherever in the examples and tables experiments and illustrations are furnished in connection with aluminum oxide aerosols substantially similar results are obtained when substituting therefore δ-aluminum oxides within the definitions herein given.

When using the aluminum oxide aerosol or δ-aluminum oxide in accordance with the invention it is not readily possible to obtain the desired vaccine depot preparations by intermixing the oxides with a suitable vaccine solution. When directly contacting the oxide with a vaccine solution a stable preparation is not obtained and sedimentation readily occurs. Even prolonged shaking and agitation will not give the desired results. It is necessary and is within the scope of my invention that the aluminum oxide aerosol or δ-aluminum oxide be first dispersed in water. This is readily accomplished it only being required to assure thorough mixing of the components. It is, however, necessary that the water be substantially ion-free and thus demineralized water should be used. It is not necessary that the components be agitated or shaken for any prolonged period of time. In most instances shaking by hand for two minutes or even less will accomplish the desired dispersion. When using mechanical high-speeded dispersion means the dispersion is almost instantaneously obtained. In any case intimate mixing is then achieved when all of the aluminum oxide has been wetted. A particular temperature is not necessary for the preparation of the suspension and temperatures between 1° C. and room temperature are readily applicable. In most cases agitation from 2 to 5 minutes depending upon the vigor of agitation and the amounts of suspension being prepared will suffice. The ratio of the aluminum oxide aerosol or δ-aluminum oxide should be such that for each gram of the oxide at least 3 to 4 ml., preferably 4 ml., of water are used. For best results it is of advantage to carry the dilution of the aluminum oxide aerosol or δ-aluminum oxide with the mineral-free water not appreciably beyond 20 ml. of water for each gram of the oxide, the preferred limit for practical purposes being, however, 15 ml. water for each gram of aluminum oxide. In this manner a stable colloidal dispersion is obtained which will remain stable and of substantially constant take-up capacity for antigen for long periods of time, test samples continuing to show for instance undeteriorated stability and take-up capacity after 5 months. It is thus possible to prepare colloidal suspensions or dispersions of the aluminum oxide aerosol or δ-aluminum oxide and keep the same in storage which greatly facilitates production since these suspensions are then always available for the preparation of depot vaccine with different antigens as demands may require.

The high take-up capacity of the aluminum oxide aerosol and δ-aluminum oxide in accordance with the invention for viruses of both the lipoid as well as the non-lipoid type is apparent from their high take-up capacity for both albumin and cephalin as e.g. described in my co-pending application simultaneously filed herewith.

*Example I*

In accordance with the albumin and cephalin take-up tests described in said co-pending application a 5% by volume calf serum solution (i.e. 0.2624% by weight albumin solution) and 0.4% by weight cephalin solution, both in ion-free aqueous medium, are each contacted with an aluminum oxide aerosol having the characteristics given for the product mentioned in column 3 before. After thorough agitation by shaking on an automatic device for 2 minutes and centrifuging, the oxide-freed liquids are then refractometrically measured to thus determine the non-absorbed albumin and cephalin, respectively. In each case the amount of aluminum oxide added was equivalent to 10 mg. per ml. aqueous medium. The original albumin and cephalin solutions being set with their refractometric readings equivalent to 100, the amounts of adsorbed albumin and cephalin, respectively, can be calculated.

The preferred refractometer which has proved to be especially suitable is the Zeiss immersion refractometer. The determination of the index of refraction is carried out at a constant temperature between 22.5° C. and 24.5° C. The virus suspension and the other liquids to be measured are adjusted to said temperature about one hour before determination is carried out.

The first step of the determination is to adjust the refractometer to a constant value for aqua dest. (in the following examples this value was 13.80). An interval of about 2 minutes should be maintained between each determination in order to allow an equalization of the temperature. It is also recommended to control the index of refraction of the distilled water, for instance, each time after three measurements. To achieve the desired accuracy, each determination is repeated several times, for instance, ten times and the arithmetic mean of the resulting repeated measurements is calculated.

The 5% calf serum solution was determined in the just indicated manner to have a refractometric value of 15.55 ±0.05 measuring units which correspond to a refractive index of substantially 1.33342 (22.8° C.). The 0.4% cephalin solution was measured for a refractometric value of 15.48 ±0.05, this corresponds to a refractive index of substantially 1.33339 (22.8° C.).

The below Table I shows comparisons of suspensions stored for varying periods with a freshly prepared suspension.

TABLE I

| Aluminum oxide aerosol sample | Time of storage (month) | Albumin take-up (percent) | Cephalin take-up (percent) |
|---|---|---|---|
| No. 196 | 0 | 73 | 28 |
|  | 1 | 76 | 25 |
|  | 2 | 74 | 27 |
|  | 3 | 74 | 27 |
|  | 5 | 76 | 32 |

In each experiment the suspension was tested for albumin take-up by diluting the same 1:10 with a 5% by volume calf serum solution in demineralized water in a manner so that in the final dilution 10 mg. of the aluminum oxide per ml. liquid were contained. Correspondingly the suspension was tested for cephalin take-up by diluting the same 1:10 with 0.4% by weight cephalin solution so that again there was present 10 mg. of the aluminum aerosol per ml. of aqueous medium. The aluminum oxide aerosol suspension was made with the same product as specified in Example I.

As is apparent from the table, both the albumin and the cephalin take-ups exceptionally high, it being considered sufficient for satisfactory virus take-up, as set forth in my said co-pending application, to obtain at least a 30% albumin take-up and a 10% cephalin take-up. No aluminum oxide product has been hitherto known capable of such high albumin and cephalin take-ups and thus of being capable of taking up at the same time such correspondingly high amounts of both the lipoid and non-lipoid type viruses. It will be further seen from the table that the take-up values for both albumin and cephalin have remained substantially the same (within experimental error) regardless of whether the product was freshly prepared or was one prepared with a suspension which had been stored for 1, 2, 3 or in excess of 5 months, respectively.

Aluminum oxide aerosol and δ-aluminum oxide preparations from different sources and/or production charges have been tested. Whereas the hitherto known aluminum oxide preparations as above stated vary to a considerable extent—even when obtained from the same source and/or different production charges made in accordance with the same method—with respect to their antigen take-up capacity for lipoid and/or non-lipoid viruses from practically useless products to those of medium and higher take-up capacity without possibility of predicting the take-up capacity, it has been found that the aluminum oxide aerosols and δ-aluminum oxides in accordance with the invention are substantially free from these variations. This is for instance shown by the 39 illustrative samples of aluminum oxide aerosols set forth in Table II in which as a representative antigen take-up test the respective albumin and cephalin take-up capacities were tested. The procedure used for the testing of each aluminum oxide aerosol sample in Table II was that set forth in connection with Example I. The aluminum oxide aerosol samples all corresponded to the characteristics therefore given with respect to particle size, crystal structure, specific gravity, molar surface and method of preparation as broadly set forth in columns 3 and 4.

TABLE II

| Aluminum oxide aerosol sample | Albumin take-up (Percent) | Cephalin take-up (Percent) | Aluminum oxide aerosol sample | Albumin take-up (Percent) | Cephalin take-up (Percent) |
|---|---|---|---|---|---|
| 38 | 62 | 23 | 12 | 67 | 26 |
| 38a | 74 | 23 | 13 | 65 | 27 |
| 38b | 70 | 22 | 14 | 67 | 28 |
| 38c | 70 | 18 | 15 | 73 | 27 |
| 38d | 61 | 21 | 16 | 64 | 27 |
| 38e | 63 | 21 | 17 | 65 | 27 |
| 38f | 70 | 27 | 18 | 67 | 27 |
| 38g | 66 | 23 | 19 | 67 | 26 |
| 38h | 61 | 22 | 20 | 64 | 28 |
| 1 | 64 | 28 | 21 | 65 | 28 |
| 2 | 64 | 28 | 22 | 65 | 28 |
| 3 | 66 | 27 | 23 | 72 | 24 |
| 4 | 66 | 26 | 24 | 71 | 25 |
| 5 | 64 | 27 | 25 | 71 | 25 |
| 6 | 64 | 28 | 26 | 65 | 26 |
| 7 | 65 | 28 | 27 | 74 | 25 |
| 8 | 64 | 26 | 28 | 70 | 25 |
| 9 | 63 | 29 | 29 | 63 | 22 |
| 10 | 67 | 28 | 30 | 69 | 25 |
| 11 | 72 | 25 |  |  |  |

As will be seen from the table the various aluminum oxide aerosol preparations used take-up albumin as well as cephalin above 60% albumin and above 20% cephalin with median values of about 66% for the albumin take-up and about 25% for the cephalin take-up. It will be thus readily seen that it is no longer necessary, as was hitherto the case with aluminum oxides previously used for aluminum oxide depot vaccines, to first test a particular aluminum oxide in order to determine whether the same was suitable for vaccine preparation or not. It is thus in accordance with the instant invention simply necessary to take aluminum oxide aerosol or δ-aluminum oxide and be in all cases assured of maximum take-up for both the non-lipoid as well as the lipoid type viruses.

The extent to which the aluminum oxide aerosols and δ-aluminum oxides facilitate vaccine production is for instance evident by the fact that maximum take-up of virus is practically instantaneous with thorough intermixing. This is again demonstrated by the albumin take-up and cephalin take-up tests herein above described. Thus when preparing the aluminum oxide aerosol suspension set forth in connection with Example I and Table I and subjecting the same to the same albumin and cephalin take-up tests described in connection with said Example I and Table I, except that various samples have been agitated, during preparation, for different periods of time and, in some instances, have been additionally left to stand after the agitation, the results do not materially differ (within experimental error) regardless of the time of agitation as is shown in Table III.

TABLE III

| Time of agitation (min.) | Time of after-standing (hours) | Albumin take-up (percent) | Cephalin take-up (percent) |
|---|---|---|---|
| 2 (manual shaking) | | 68 | 34 |
| Do | 24 | 69 | 34.5 |
| 5 (automatic shaking device) | | 70 | 34 |
| 10 (automatic shaking device) | | 70.5 | 33.5 |
| 20 (automatic shaking device) | | 68 | 36 |
| Do | 24 | 70 | 34 |
| 40 (automatic shaking device) | | 69.5 | 35 |

Thus again the production of vaccine is facilitated and materially shortened as it is only necessary to thoroughly and briefly mix the aluminum oxide aerosol or δ-aluminum oxide suspension with the particular antigen solution in order to obtain products of maximum potency.

Furthermore the products in accordance with the invention are characterized by a particle size such that they will readily pass through even very small cannulae as they are for instance used in syringes for inoculation or vaccination of children. Still further it is possible to prepare the vaccines in greater than single unit dosage form, such as ampules, as the vaccines made with the aluminum oxide aerosol or δ-aluminum oxide in accordance with the invention remain of substantially undiminished potency and are substantially stable for long periods of time without fear of sedimentation. Thus for instance there is no danger of an incorrect antigen administration when for example using 10 ml. ampules from which a number of single unit dosages are taken.

The depot vaccines in accordance with the invention comprise aluminum oxide aerosol or δ-aluminum oxide substantially colloidally dispersed in an aqueous medium and carrying at least one antigen being a member of the group consisting of the viruses, the bacteria, the endotoxins, the ectotoxins and the corresponding toxoids. Thus the invention covers the same type of vaccine made with the same toxoids and/or viruses and/or bacteria derived products as are set forth and described in connection with the aluminum oxide depot vaccines of said Austrian patent herein above mentioned.

The vaccines in accordance with the invention should contain at least the minimum vaccine effective amounts of the particular antigen used, they may be more concentrated with respect to the minimum effective amounts in which case they may serve as vaccine concentrates. The minimum effective amounts of various antigens, however, not only differ from antigen to antigen but are also expressed in terms of different units so that it is not readily possible to define minimum effective vaccine amounts of antigens in the same terms or same minimum amounts. By way of illustration the following antigens are useful in accordance with the invention each being given with the minimum vaccine effective amounts. It is to be noted in this connection that the effectiveness or activity of a vaccine solution or suspension normally increases when taken up by the aluminum oxide. It is therefore even possible to contact the aluminum oxide suspension in accordance with the invention with an antigen solution or suspension having a somewhat less than vaccine effective amount to thereby obtain an aluminum depot product having the desired minimum efficiency as a vaccine. In all cases, however, where the vaccine suspension or solution itself alread possesses the minimum vaccine effective amount the aluminum oxide depot vaccine will possess a better than minimum amount.

In the following examples, the cited minimum vaccine effective amounts in each case are those which were found to be the minimum amounts at the present time.

*Poliomyelitis vaccine.*—In the below Example II in inactive trivalent mixture of polio type I-Mahoney, polio type II-MEF$_1$, polio type III-Saukett was used. Such a mixture has a minimum vaccine effective amount which is expressed in tissue culture infectious doses (TC ID$_{50}$) of about $10^6$/ml. Further details see U.S.A. Department of Health, Education and Welfare: Minimum requirements, Federal Reg. (1956), p. 4922. The said polio virus suspension was used in Example II and was characterized for type I with $10^{7.3}$, for type II with $10^{7.1}$, and for type III with $10^{6.9}$ ID$_{50}$ per ml. It was prepared in accordance with the method set forth by Salk in J. Amer. Med. Assoc., 151, 1953, p. 1081, and 158, 1955, p. 1239; see also U.S.A. Department of Health, Education and Welfare: Minimum requirements, Federal Reg. (1956), p. 4922. The effectiveness of this vaccine was tested in a guinea pig test according to "Staats-Anzeiger für das Land Hessen" (1959): Staatliche Prüfung von Impfstoffen gegen Kinderlähmung No. 12, pp. 344–349, the titer being calculated according to Reed and Muench, Amer. J. Hyg. 27, 1938, p. 493.

*Diphtheria toxoid.*—Instead of the polio virus suspension used in connection with Example II there may be substituted a diphtheria toxoid consisting of a highly purified, ultra-filtered concentrate with an Lf-content of 5050 per ml. This diphtheria toxoid is made in accordance with the method set forth in Federal Security Agency, NIH, Bethesda, 4th Revision, Mar. 1, 1947 (minimum requirements: Diphtheria-toxoid); Dept. of Health, Education and Welfare, Apr. 8, 1954 (minimum requirements: Diphtheria-toxoid), Amendment No. 1. The diphtheria toxoid has a minimum vaccine effective amount which is normally expressed in terms of protective units (IE/ml.) which are in correlation to the flocculation units (Lf/ml.). The minimum vaccine effective amount is 1 Lf/ml. Further details see Prigge, Klin. Wochenschrift, 27, 1949, p. 685, and Ramon, Ann, Inst. Pasteur, 37, 1923, p. 1001. The effectiveness of this toxoid was tested according the method of Prigge, Bull. Wld. Hlth, Org., 9, 1953, p. 843, and Deutsche Med. Wochenschrift 1937, p. 1478.

The aluminum oxide areosol-diphtheria toxoid was prepared according to the method set forth for polio vaccine in Example II, similar good results being obtained on testing the effectiveness thereof (see also Examples IV and V).

*Tetanus toxoid.*—There may be also substituted in Example II for the polio suspension therein mentioned a tetanus toxoid under otherwise substantially identical conditions. The product used was a highly purified, ultra-filtered concentrate with an Lf-contact of 1800 per ml. Also tetanus toxoids are measured in their minimum vaccine effective amounts in terms of Lf, the minimum effective amount for this toxoids being about 1 Lf/ml. Further details see Prigge; Bull. Wld. Hlth. Org. 9, 1953, p. 843; in this literature, also the method for testing the effectiveness of tetanus toxoid is described. The tetanus toxoid was prepared in accordance with the method set forth in Federal Security Agency, NIH, Bethesda, 4th Revision, Dec. 15, 1952 (minimum requirements: Tetanus-toxoid); Dept. of Health, Education and Welfare, Apr. 8, 1954 (minimum requirements: Tetanus-toxoid), Amendment No. 1. The aluminum oxide aerosol-tetanus toxoid was prepared according to the method set forth for polio vaccine in Example II, similar good results being obtained on testing the effectiveness thereof (see also Examples III, IV and V.)

*Pertussis vaccine.*—Alternatively pertussis vaccine may be substituted for the polio vaccine in Example II by using purified, inactivated pertussis concentrate prepared in accordance with U.S. Dept. of Hlth., Education and Welfare, NIH, Bethesda, 1st Revision, Oct. 31, 1952 (minimum requirements: pertussis-vaccine); see also amendments No. 3 and 4 of Jan. 29, 1954 and Oct. 2, 1956, respectively. The effectiveness of this vaccine was tested according to the method set forth in the above named literature references. Vaccine effective amounts for this antigen are measured in terms of bacteria count per ml. The minimum vaccine effective amounts for this antigen are $10 \times 10^9$ germs/ml. (U.S.-standard pertussis vaccine) and the particular concentrate used had a bacteria count of $900 \times 10^{11}$ per ml. The aluminum oxide aerosol-pertussis vaccine was prepared according to the method set forth for polio vaccine in Example II, similar good results being obtained on testing the effectiveness thereof (see also Example V).

*Measles vaccine.*—The production of an aluminum oxide-measles vaccine in accordance with the invention is set forth in Example VI. The vaccine there used is of the strain Edmonston with a virus content of $10^{4.5}$ TC $ID_{50}$ per ml. Effective amounts of this type of virus are measured in terms of tissue culture infectious doses (TC $ID_{50}$/ml.). The minimum vaccine effective amount is $10^4$ TC $ID_{50}$/ml. Further details see Warren, Amer. J. Dis. Child. 103, 1962, p. 418. In this literature, also the preparation of measles vaccine as well as the method for testing its effectiveness is described.

*Newcastle disease vaccine.*—Use of this vaccine is illustrated in Example VIII and the particular vaccine used was the inactivated strain Italia adapted to the chicken embryo with a virus content of $10^{11.2}$ $ID_{50}$ per ml. and a hemagglutinin titer of 1:2560. This vaccine was prepared as set forth by Hallauer, Handbuch der Virusforschung, II. suppl. vol., Springer-Verlag Wien, 1960, p. 141–220. Vaccine effective amounts of this vaccine are measured in terms of hemagglutinin units, and the minimum vaccine effective amounts have been found to be about 200 hemagglutinin units per ml. Testing for effectiveness of the Newcastle disease vaccine was carried out according to the method described by Gehring, Monatshefte f. Tierheilkunde 10, 1959, p. 123; see also "Vorschriften für die staatliche Prüfung von Impfstoffen gegen Geflügelpest," Staatsanzeiger für das Land Hessen 1959, No. 21 and 25, p. 553 and 651, respectively.

The preparation of the vaccines in accordance with the following examples was carried out using in all cases an aluminum oxide aerosol suspension prepared in the following manner:

1,000 grams of the aluminum oxide aerosol were weighed into a 20 litre V4A (stainless steel) vessel and were sterilized therein for 1½ hours at 180° C. The sterilized aluminum oxide was then admixed with 5 litre of dimineralized water and agitated on a shaking device for about 2 minutes until all the aluminum oxide was wetted with water. The aluminum oxide content of the suspension is 200 mg. per ml. This storage suspension is preferably stored at +4° C.

*Example II*

95 parts by volume of the trivalent polio vaccine above identified were mixed with 5 parts by volume of stabilized, i.e. water-admixed suspension of aluminum oxide aerosol as above described and were shaken for 2 minutes on a shaking device in a cool-room. A vaccine of the same composition, however, without aluminum oxide was also prepared for comparison purposes.

The effectiveness of this vaccine was tested in a guinea pig experiment. In accordance therewith groups of guinea pigs of 8 animals each, are each given 1 ml. of vaccine at an interval of 42 days. Blood sampling is carried out 18 days after the 2nd injection. The antibody content is tested against 100 $ID_{50}$ of the types I-Mahoney, II-MEF$_1$ and III-Saukett on Hela tissue cultures. The titer calculation is carried out in accordance with the methods of Reed and Muench. The results are shown in Table IV. Details of the guinea pig testing and of the calculations may be seen from Staats-Anzeiger für das Land Hessen (1959): Staatliche Prüfung von Impfstoffen gegen Kinderlähmung No. 12, pp. 344–349; see also Reed and Muench, Am. J. Hyg. 27 1938, p. 493.

The following Table IV shows the polio effectiveness after injection with polio-aluminum oxide aerosol vaccine in accordance with Example II.

TABLE IV

| Vaccine | Dosage in ml. | Antibody titer 18 days after 2nd injection | | |
|---|---|---|---|---|
| | | Type I | Type II | Type III |
| Polio $Al_2O_3$ aerosol vaccine | 2×1 | 1:218 | 1:2440 | 1:71 |
| Polio blank | 2×1 | 1:12 | 1:128 | 1:8 |

*Example III*

95 parts by volume of trivalent polio vaccine are admixed with 5 parts by volume of the same aluminum oxide aerosol suspension used in the Example II and are agitated on an automatic shaker for 2 minutes in a cool-room. There was then added so much of the tetanus concentrate above-mentioned in connection with Example II that the toxoid content is 1 Lf per ml., whereupon the mixture is again agitated on the shaking device for 2 minutes. For comparison purposes an equivalent polio tetanus vaccine without aluminum oxide was prepared.

The polio effectiveness was determined in accordance with the method described in connection with Example II, while the tetanus effectiveness was tested in accordance with Prigge as described in Bull. Wld. Hlth. Org. 9, 1953, p. 843. The results of the testing are set forth in Table V.

TABLE V

| Vaccine | Dosage in ml. | Effectiveness | | | |
|---|---|---|---|---|---|
| | | Polio (antibody titer) | | | Tetanus (IE/ml.) |
| | | Type I | Type II | Type III | |
| Polio tetanus $Al_2O_3$ aerosol vaccine | 2×1 | 1:110 | 1:1420 | 1:91 | 87 |
| Polio tetanus blank | 2×1 | 1:20 | 1:96 | 1:12 | 12 |

*Example IV*

95 parts by volume of trivalent polio vaccine as used in Example II were mixed with 5 parts by volume of the same aluminum oxide aerosol suspension used in the preceding examples and were agitated at 4° C. (cool-room) for 2 minutes on an automatic shaking device. Thereupon diphtheria and tetanus toxoid concentrates being the same mentioned in connection with the alternative embodiments to Example II were added in amounts sufficient to give the mixture per ml. 8 Lf diphtheria toxoid and 1 Lf tetanus toxoid. The polio-toxoid mixture was again agitated for 2 minutes in the cool-room. A comparison vaccine of equivalent concentrations but without aluminum oxide was prepared and tested.

The testing for polio effectiveness was carried out as set forth in connection with Example II, while the testing for diphtheria and tetanus effectiveness was carried out according to Prigge as set forth in Bull. Wld. Hlth.

Org. 9, 1953, p. 843, and Deutsche Med. Wochenschrift 1937, p. 1478. The results are set forth in Table VI.

the aluminum oxide. Testing for measles effectiveness was made in accordance with Warren on guinea pigs as

TABLE VI

| Vaccine | Dosage (ml.) | Effectiveness | | | | |
|---|---|---|---|---|---|---|
| | | Polio (antibody titer) | | | Diphtheria (IE/ml.) | Tetanus (IE/ml.) |
| | | Type I | Type II | Type III | | |
| Polio diphtheria tetanus Al₂O₃ aerosol vaccine | 2×1 | 1:140 | 1:2200 | 1:110 | 62 | 93 |
| Polio diphtheria tetanus blank | 2×1 | 1:16 | 1:164 | 1:23 | 11 | 15 |

*Example V*

93.29 parts by volume of trivalent polio vaccine as used in Example II were mixed with 5 parts by volume of the same aluminum oxide aerosol suspension as used in the preceding examples. The mixture is agitated for 2 minutes in a cool-room on an automatic shaking device. Thereupon there is added 0.11 part by volume of diphtheria concentrate and 0.06 part by volume of tetanus concentrate, both the same as that hitherto described in the alternatives to Example II. The amounts added are such that the toxoid content of the mixture yields 8 Lf diphtheria toxoid per ml. and 1 Lf tetanus toxoid per ml. The polio-toxoid mixture is then once more agitated in a cool-room for 2 minutes on an automatic shaking device. Finally there is added 1.54% of pertussis concentrate in an amount sufficient to give a bacteria count of $15 \times 10^9$ per ml. mixed vaccine. The pertussis concentrate was the same as that herein above mentioned in connection with an alternative to Example II. This mixture was then once more agitated for 2 minutes in a cool-room on an automatic shaking device. There was also prepared for control purposes a comparison vaccine containing equivalent proportions of the individual antigens but without aluminum oxide.

The testing for effectiveness of the polio and toxoid components was carried out as above set forth. The pertussis effectiveness was tested as set forth in U.S. Dept. of Health, Education and Welfare, NIH, Bethesda, 1st Revision, Oct. 31, 1952 (minimum requirements: Pertussis-vaccine), see also amendment No. 4 of Oct. 2, 1956. The results of the various effectiveness tests are set forth in Table VII.

set forth in Amer. J. Dis. Child., 103, 1962, p. 418. The results are shown in Table VIII.

TABLE VIII

| Vaccine | Dosage in ml. | Effectiveness (antibody titer) |
|---|---|---|
| Measles Al₂O₃ aerosol vaccine | 3 × 1 | 1:360 |
| Measles blank | 3 × 1 | 1:74 |

*Example VII*

There were separately prepared and each agitated for 2 minutes in a cool-room on an automatic shaker the following:

(a) 47.5 parts by volume of trivalent polio vaccine being the same as that heretofore identified in connection with Example II together with 2.5 parts by volume of the aluminum oxide aerosol suspension heretofore identified, (b) 47.5 parts by volume of the same measles vaccine heretofore identified and 2.5 parts by volume of the said aluminum oxide aerosol suspension.

Both of the resulting products were then combined and once more agitated for 2 minutes in a cool-room. Polio effectiveness was then tested in accordance with the meth-

TABLE VII

| Vaccine | Dosage (ml.) | Effectiveness | | | | | |
|---|---|---|---|---|---|---|---|
| | | Polio (antibody titer) | | | Diphtheria (IE/ml.)[1] | Tetanus (IE/ml.)[1] | Pertussis (SE/ml.)[2] |
| | | Type I | Type II | Type III | | | |
| Polio diphtheria tetanus pertussis Al₂O₃ aerosol vaccine | 2×1 | 1:73 | 1:2360 | 1:110 | 73 | 102 | 45 |
| Polio diphtheria tetanus pertussis blank | 2×1 | <1:4 | 1:64 | <1:4 | 8 | 15 | 14 |

[1] IE/ml.=international units (protection units) per ml.
[2] SE/ml.=protection units per ml.

*Example VI*

96 parts by volume of measles vaccine, using the product above identified, were mixed with 4 parts by volume of the herein identified aluminum oxide aerosol suspension and agitated for 2 minutes in a cool-room on an automatic shaking device. A comparison vaccine was also prepared using the same measles vaccine but without od set forth in connection with Example II, while the measles effectiveness was tested in accordance with Warren set forth in Example VI.

There was also prepared a mixed vaccine of corresponding concentration using the same antigens but without the aluminum oxide.

The results of the effectiveness tests which were carried out in accordance with the methods previously described are given in Table IX.

TABLE IX

| Vaccine | Dosage (ml.) | Effectiveness | | | |
|---|---|---|---|---|---|
| | | Polio (antibody titer) | | | Measles (antibody titer) |
| | | Type I | Type II | Type III | |
| Polio measles Al₂O₃ aerosol vaccine | 3 × 1 | 1:210 | 1:3360 | 1:181 | 1:256 |
| Polio measles blank | 3 × 1 | 1:48 | 1:512 | 1:32 | 1:54 |

*Example VIII*

Chicken embryos were inoculated with Newcastle-disease virus being the same as that hereinabove identified. The pooled virus containing allantois liquid of the embryos was then inactivated with formaldehyde 1:4,000 within 4 days and thereupon diluted with 1:2 physiological phosphate buffered sodium chloride solution. 97 parts by volume of this inactivated Newcastle-disease virus suspension are then mixed with 3 parts by volume of the hereinabove identified aluminum oxide aerosol suspension and agitated for 2 minutes in a cool-room on an automatic shaking device.

Testing for effectivness was carried out in accordance with the procedures outlined by Gehring in Monatshefte f. Tierheilkunde 10, 1959, p. 123; see also Staatsanzeiger für das Land Hessen 1959, No. 21 and 25, p. 553 and 651, respectively. The results are shown in the following Table X.

TABLE X

| Vaccine | Dosage in ml. | Effectiveness (IE/ml.) |
|---|---|---|
| Newcastle-disease Al₂O₃ aerosol vaccine | 1 | 560 |
| Newcastle-disease blank | 1 | 48 |

It is conventionally known in the art that with respect to the effectiveness of vaccines the results shown in animal experiments are translatable and correspond to results for human beings as is for instance set forth in the following literature:

*For polio.*—Gard et al., Arch. f. d. gesamte Virusforschung 8, 1958, p. 423; Kokko and Murray, Bull. Wld. Hlth. Org., 22, 1960, p. 263.

*For diphtheria.*—Prigge, Ergebnisse der Hygiene, 22, 1939, p. 1–68; see also the official rules for the "minimum requirements" cited in the alternative embodiments of Example II.

*For tetanus.*—Edsall, J. Amer. Med. Assoc., 171, 1959, p. 417; see also the official rules for the "minimum requirements" cited in the alternative embodiments of Example II.

*For measles.*—Feldman, Amer. J. Dis. Child., 103, 1962, p. 423; Karzon et al., Amer. J. Dis. Child, 103, 1962, p. 425; Karelitz et al., Amer. J. Dis. Child. 103, 1962, p. 427.

*For pertussia.*—Medical Research Council, Brit. Med. Journ. II, 1956, p. 454; see also the official rules for the "minimum requirements" cited in Example V.

It is obvious from the foregoing that other aluminum oxide aerosol concentrations or, if δ-aluminum oxide is used concentrations thereof, may be used in the various examples describing the production of various antigen vaccines. As hereinabove stated, minimum dilution, i.e. maximum concentration of 3–4 ml. of water per gram of aluminum oxide and preferably 4 ml. of water per gram of aluminum oxide are important as below such concentration the resulting solutions do not possess the desired degree of stability. On the other hand, when substituting lesser concentrations and higher or lesser concentrations than those specified in the various examples similar results are obtained. It is equally possible to substitute in the various examples antigens having a higher or lesser effectiveness this being essentially a matter of choice and depending upon the particular use or uses to which it is intended to put the vaccine. Thus, as previously indicated, antigen suspensions or solutions of high activity may be used in order to prepare vaccine concentrates.

As is apparent from the foregoing, it is possible in accordance with the invention to prepare combination vaccines of the type which it has been hitherto difficult if not impossible to obtain. To this group belong for instance the polio-diphtheria-tetanus-pertussis vaccines because it was not hitherto possible to so stabilize the polio component that the negative effect of the toxoids and of the pertussis antigen on the polio virus could be eliminated or rendered harmless. Such combination vaccines are not stable for a sufficient length of time to be practical. It has not even been possible to prepare such combination vaccines with a polio combination by the use of aluminum oxides, such as of the γ-type. When proceeding, however, in accordance with the invention and using, as herein set forth, aluminum oxide aerosol or δ-aluminum oxide such polio combination vaccines of high stability for long periods of time may be readily produced.

Histological and histochemical investigations have shown that tissues react differently to vaccines with aluminum oxide aerosol or δ-aluminum oxides as compared with other aluminum oxides as for instance of the γ-type. Thus in the interior of the inoculation center there are found after the injection of an aluminum oxide aerosol or δ-aluminum oxide preparation very homogeneous cell masses, whereas when using a γ-type aluminum oxide scaly cell masses result. Furthermore, the median zone of the γ-aluminum oxide inoculation area shows a relatively large number of giant cells with several centers of the type of foreign body giant cells which are absent in the aluminum oxide aerosol or δ-aluminum oxide inoculation centers. This zone is furthermore much wider in the γ-aluminum oxide depots than they are in the aluminum oxide aerosol or δ-aluminum oxide depots and the mesenchymal reaction is stronger in the γ-aluminum oxide type inoculation center. Important is also that the outer zone of the aluminum oxide aerosol or δ-aluminum oxide inoculation center shows an incapsulation by tissues after a much shorter period of time after inoculation than this is the case for γ-type aluminum oxide. The histochemical aluminum test shows for the γ-type aluminum oxide inoculation zone flaky and homogeneous surfaces, while the aluminum in the aluminum oxide aerosol and δ-aluminum oxide depot is present only in diffuse form.

I claim:

1. A depot vaccine comprising a finely divided aluminum oxide selected from the group consisting of δ-aluminum oxide and aluminum oxide aerosol having a particle size of 25 to 1,000 A. having adsorbed thereon at least one antigen derived from a virus in an at least minimum vaccine effective amount, dispersed in an aqueous medium, 3–20 ml. of water being present for each gram of aluminum oxide.

2. A depot vaccine according to claim 1, wherein 4–15 ml. of water are present for each gram of aluminum oxide.

3. A depot vaccine according to claim 1, wherein said aluminum oxide has a particle size of substantially 50–300 A.

4. A depot vaccine according to claim 1 in dosage unit form.

5. A depot vaccine according to claim 1, wherein said aluminum oxide is aluminum oxide aerosol.

6. A depot vaccine according to claim 1, wherein said antigen is a poliomyelitis virus.

7. A depot vaccine according to claim 1 wherein said antigen is a measles virus.

8. A depot vaccine according to claim 1, wherein said antigen is Newcastle disease virus.

9. A depot vaccine comprising a finely divided aluminum oxide selected from the group consisting of δ-aluminum oxide and aluminum oxide aerosol having a particle size of 25 to 1,000 A. and having adsorbed thereon at least one antigen derived from a bacteria in an at least minimum vaccine effective amount, dispersed in an aqueous medium, 3–20 ml. of water being present for each gram of aluminum oxide.

10. A depot vaccine according to claim 9, wherein said antigen is pertussis bacteria.

11. A depot vaccine comprising a finely divided aluminum oxide selected from the group consisting of δ-aluminum oxide and aluminum oxide aerosol having a particle size of 25 to 1,000 A. and having adsorbed thereon at least one antigen derived from an ectotoxoid in an at least minimum vaccine effective amount, dispersed in an aqueous medium, 3–20 ml. of water being present for each gram of aluminum oxide.

12. A depot vaccine according to claim 11, wherein said antigen is bacteria ectotoxoid.

13. A depot vaccine according to claim 11, wherein said antigen is tetanus ectotoxoid.

References Cited by the Examiner

FOREIGN PATENTS

| | | |
|---|---|---|
| 878,342 | 6/1953 | Germany. |
| 1,058,698 | 6/1959 | Germany. |

OTHER REFERENCES

Chemical Abstracts (i), volume 55, entry 22748h, 1961, citing Rooksby et al., Clay Minerals, Bull. 4, 234–8 (1961).

Chemical Abstracts (ii), volume 57, entry 3853g, 1962, citing Drescher, Am. J. Hyg., 74, 104–18 (1961).

Hackh Chemical Dictionary, Third edition, published by McGraw-Hill Book Company, Inc., New York, 1944, page 40.

Newsome et al.: Alumina Properties, published by Aluminum Company of America, Pittsburgh, 1960, page 46.

LEWIS GOTTS, *Primary Examiner.*

JULIAN S. LEVITT, *Examiner.*

RICHARD L. HUFF, *Assistant Examiner.*